United States Patent
Cheng et al.

(10) Patent No.: US 10,705,754 B2
(45) Date of Patent: Jul. 7, 2020

(54) ZERO-DATA LOSS RECOVERY FOR ACTIVE-ACTIVE SITES CONFIGURATIONS

(71) Applicant: International Business Machines Corporation, Armonk, NY (US)

(72) Inventors: Jing Cheng, Beijing (CN); Wei Liu, Beijing (CN); Xing Jun Zhou, Shanghai (CN); Mai Zeng, Beijing (CN); Wen Z. Liu, Beijing (CN); Si Bin Fan, Beijing (CN); Hong Tao Li, Beijing (CN); Wei H. Liu, Beijing (CN); Jiong Fan, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 16/015,442

(22) Filed: Jun. 22, 2018

(65) Prior Publication Data
US 2019/0391740 A1 Dec. 26, 2019

(51) Int. Cl.
*G06F 3/06* (2006.01)
*G06F 16/27* (2019.01)
*G06F 11/20* (2006.01)

(52) U.S. Cl.
CPC .............. *G06F 3/065* (2013.01); *G06F 3/067* (2013.01); *G06F 3/0619* (2013.01); *G06F 11/2074* (2013.01); *G06F 16/273* (2019.01)

(58) Field of Classification Search
None
See application file for complete search history.

(56) References Cited

U.S. PATENT DOCUMENTS

| 7,627,729 B2 * | 12/2009 | Bartfai | G06F 11/2058 711/162 |
| 8,799,211 B1 * | 8/2014 | Bezbaruah | G06F 16/184 707/610 |
| 9,081,842 B1 | 7/2015 | Natanzon et al. | |

(Continued)

OTHER PUBLICATIONS

"Active/Passive vs. Active/Active | India." Load Balancer | Load Balancing | Server Load Balancer Hardware & Software. Web. Jun. 21, 2018. <http://kemptechnologies.com/in/white-papers/unfog-confusion-active-passive-activeactive-load-balancing/>. 6 pages.

(Continued)

*Primary Examiner* — Kaushikkumar M Patel
(74) *Attorney, Agent, or Firm* — Cantor Colburn LLP; Noah Sharkan (57) ABSTRACT

A computing system includes a first storage unit at a first computing site. The first storage unit stores units of work data and data synchronously replicated from a first server cluster of a second computing site. The system further includes a second server cluster at the first computing site, the second server cluster is a proxy node of the first server cluster. The system further includes a second storage unit at the first computing site, the second storage unit stores the units of work data and data from the first storage unit asynchronously into the second storage unit. The system further includes a third server cluster at the first computing site, the third server cluster processes the units of work data asynchronously replicated into the second storage unit.

17 Claims, 7 Drawing Sheets

(56) References Cited

U.S. PATENT DOCUMENTS

| | | | |
|---|---|---|---|
| 9,552,217 | B2 | 1/2017 | Tarasuk-Levin et al. |
| 9,875,266 | B2 | 1/2018 | Bourbannais et al. |
| 2005/0050115 | A1* | 3/2005 | Kekre ................ G06F 11/2058 |
| 2005/0182910 | A1* | 8/2005 | Stager ................ G06F 11/1456 711/162 |
| 2005/0251633 | A1* | 11/2005 | Micka ................ G06F 11/2058 711/162 |
| 2006/0074993 | A1 | 4/2006 | Pulamarasetti et al. |
| 2011/0066592 | A1* | 3/2011 | Newport ............... G06F 16/275 707/615 |
| 2012/0278283 | A1* | 11/2012 | Hildebrand ........... G06F 11/203 707/634 |
| 2013/0007503 | A1* | 1/2013 | Anaya ................ G06F 11/2035 714/4.1 |
| 2014/0325157 | A1* | 10/2014 | Sangapu ................ G06F 3/061 711/126 |
| 2015/0058864 | A1 | 2/2015 | Bourbonnais et al. |
| 2015/0112931 | A1* | 4/2015 | Bourbonnais ....... H04L 67/1095 707/626 |
| 2015/0113537 | A1* | 4/2015 | Bourbonnais ......... G06F 9/5083 718/103 |
| 2016/0246867 | A1 | 8/2016 | Bourbonnais et al. |

OTHER PUBLICATIONS

"Disaster Recovery and Active/Passive Replication Systems—Shadowbase." Home—Shadowbase. Web. Jun. 21, 2018. <http://shadowbasesoftware.com/solutions/business-continuity/disaster-recovery/>. 4 pages.

Englemann et al., "Symmetric Active/Active High Availability for High-Performance Computing System Services" Journal of Computers, vol. 1, No. 8, Dec. 2006, 43-54.

* cited by examiner

ZERO-DATA LOSS RECOVERY FOR ACTIVE-ACTIVE SITES CONFIGURATIONS

BACKGROUND

The present invention relates to continuous availability between sites that are geographically separated from each other, and more specifically, to a multi-site continuous availability computing environment with a recover point objective (RPO) of zero seconds in case of an outage of a site.

In the past, some computer availability and disaster recovery solutions were limited to a maximum distance between sites. Other past solutions required starting systems, applications, and supporting infrastructure on the backup site that could in some cases take several hours to restart. Some past solutions additionally required modifications to software applications, such as database servers, and hardware, such as routers and switches, in order to implement various disaster recovery and continuous availability functions, resulting in relatively high implementation cost. Some past solutions operated at a site level, rather than at a workload level.

These issues have been substantially addressed by continuous availability solutions between sites at unlimited distances. However, it remains very difficult to be able to achieve an RPO of zero seconds when the sites are separated by relatively long distances.

SUMMARY

According to one or more embodiments of the present invention, a computing system includes a first storage unit at a first computing site, the first storage unit to store units of work data and data synchronously replicated from a first server cluster of a second computing site. The computing system further includes a second server cluster at the first computing site, the second server cluster is a proxy node of the first server cluster. The computing system further includes a second storage unit at the first computing site, the second storage unit to store the units of work data and data from the first storage unit asynchronously into the second storage unit. The computing system further includes a third server cluster at the first computing site, the third server cluster to process the units of work data asynchronously replicated into the second storage unit.

According to one or more embodiments of the present invention, a method includes, by a first storage unit of a first computing site, synchronously replicating units of work data and data that result from processing the units of work data by a first server of a second computing site. The method further includes, storing, by a second server of the first computing site, the units of work data and the data asynchronously from the first storage unit to a second storage unit of the first computing site, the second server is a proxy node of the first server of the second computing site. The method further includes, by a third server of the first computing site, processing the units of work data asynchronously replicated from the first storage unit.

According to one or more embodiments of the present invention, a computer program product for providing continuous availability includes a computer readable storage medium having stored thereon program instructions that are executable by one or more processing devices to cause the one or more processing devices to provide continuous computing availability for a system including a first computing site and a second computing site. A method for providing the continuous computing availability that is performed by the processing devices includes, synchronously replicating units of work data and data that result from processing the units of work data by a first server of a second computing site. The method further includes, storing, by a second server of the first computing site, the units of work data and the data asynchronously from the first storage unit to a second storage unit of the first computing site, the second server is a proxy node of the first server of the second computing site. The method further includes, by a third server of the first computing site, processing the units of work data asynchronously replicated from the first storage unit.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
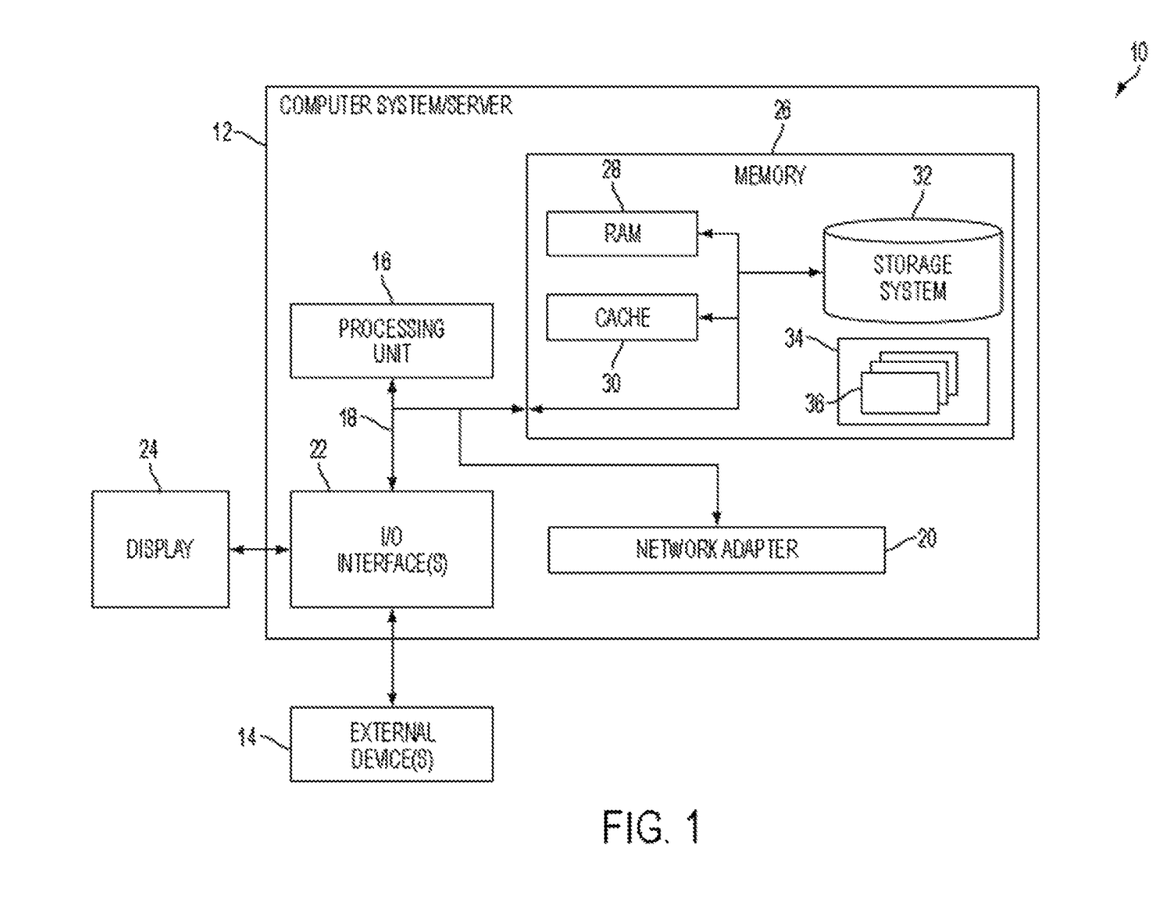
FIG. 1 depicts a cloud computing node according to one or more embodiments of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 26 can include computer system readable media in the form of volatile memory, such as random access memory (RAM) 28 and/or cache memory 30. Computer system/server 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
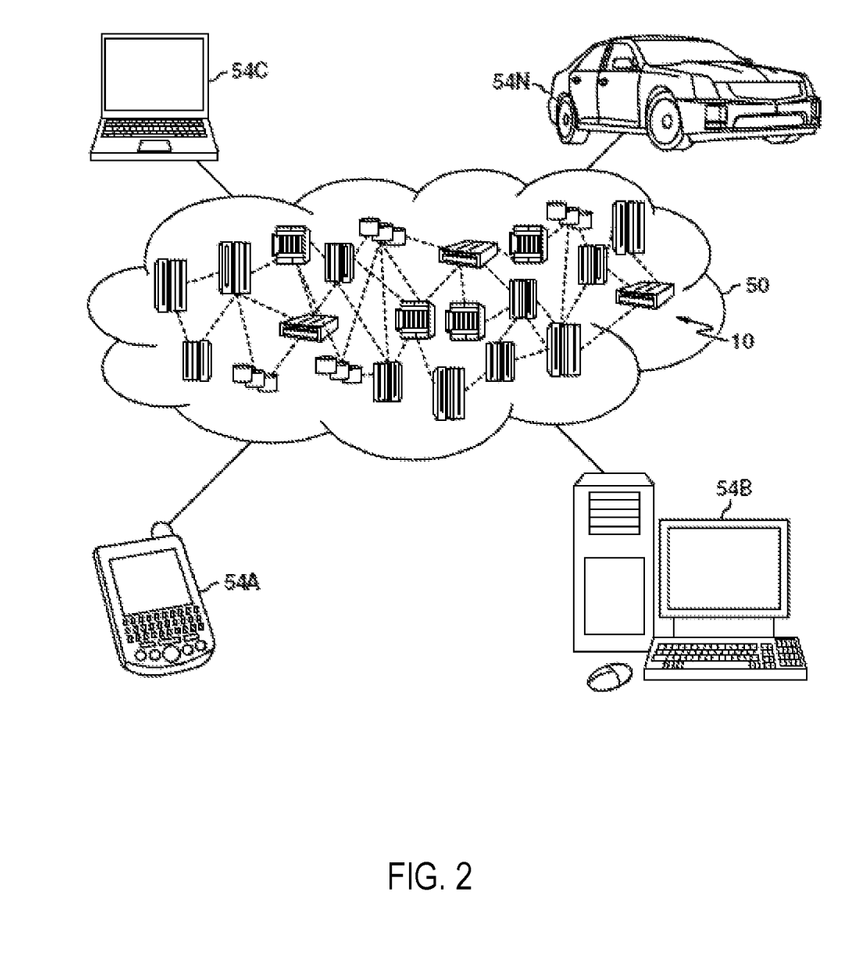
FIG. 2 depicts a cloud computing environment according to one or more embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
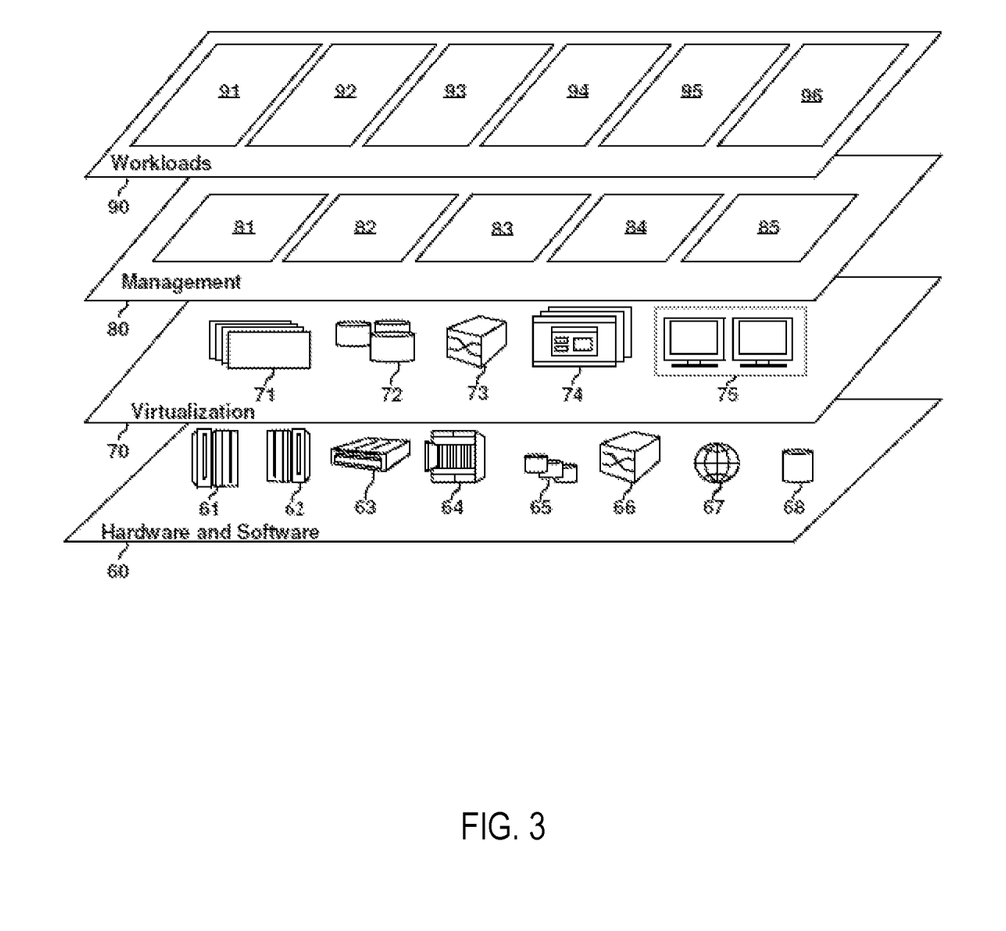
FIG. 3 depicts abstraction model layers according to one or more embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data synchronization 96.

With regard to the resource provisioning and service level management functions of the management layer 90, some embodiments of the present invention provide continuous availability of workloads, disaster recovery, workload distribution and replication of application data across a plurality of sites. In particular, the embodiments of the invention provide a recover point objective (RPO) of zero seconds for the sites that are separated by relatively long distances.

Some existing availability systems are limited geographically and/or by recovery time. When one or more workloads are spread across multiple servers in a single location, the servers for each workload may share a single data repository, and all data related to each of workloads may be stored in the same location. When the workloads are split among geographically separated sites, a single data repository for each workload is not always feasible.

In these instances, data from the one or more workloads may be stored in a data repository at a primary site, and the data may be synchronized, between the primary site and a copy of the data at the secondary site. The time that it takes to synchronize the databases is called latency. As sites are spread further apart geographically, latency may increase because of the time it takes to move the data over a network in order to synchronize it. For instance, one millisecond of latency is added per 100 fiber kilometers between the sites. Once latency increases beyond a relatively small amount of time, transferring data between data centers requires increasingly longer periods of time to achieve synchronization.

As a result, some existing availability systems provide acceptable workload performance only within a limited geographic area. In some cases, this limited geographic area may be approximately 10 to 20 fiber kilometers (i.e., 10 to 20 linear kilometers of a fiber optic network).

Disaster recovery systems are designed to switch between a primary data center and a backup data center in situations where the primary data center becomes unavailable, such as, for example, during a power outage, or other unplanned site level component failure, for example UPS, cooling system etc. The primary data center may also become unavailable because of unplanned site failure caused by events like fire, earthquake, water leaking etc. For example, during normal operation all transactions may be distributed to the primary data center and the data may be periodically replicated bit-by-bit to the secondary site or sites.

Workloads generally may be executed in parallel on at least two distinct computing systems. Typically, at least two instances of a workload may be executed virtually simultaneously on at least two geographically separated computing systems, for example, an active instance executing on a computing system at a primary site and a standby instance executing on another computing system at a secondary site. Such a configuration may sometimes be referred to in the art as an active-active workload. But the existing Active-Active solution has a severe limitation that if one site crashes abruptly, the other site will lose some during taking over the transactions from the crashed site because of the asynchronous software data replication that is typically used. Such data loss is not acceptable, especially in critical applications such as banking, military applications etc., that require to ensure 24*7 non-interrupting data transaction continuity to maintain data consistency across both (or more) sites.

The distance between sites may include, for example, distances greater than the area covered within a metro area network (MAN), that is, a network that may span distances measured in tens of kilometers, for example, up to about 20 fiber kilometers. Some customers require that a primary site and a secondary redirection site be separated by distances sufficient to ensure that a disaster affecting one site is not likely to affect the other. Although these distances vary based on regional and environmental conditions, primary and secondary sites sometimes are separated by distances that extend beyond a MAN.

In some embodiments, the customer acceptability window may be measured by the length of an RPO. An RPO, as known in the art, is the unit of time up to which the secondary site's data is current after the primary site becomes unavailable. That is, an RPO defines the maximum targeted time period in which data might be lost after the primary site becomes unavailable. For example, the customer acceptable window may require an RPO of zero seconds of data loss when an unplanned interruption occurs.

In some embodiments, a workload may consist of one or more computing applications or jobs, as well as associated middleware runtime environments, data source objects used by the applications, and the network addressability of the applications. In some embodiments, a workload may consist of one or more computing applications, jobs or threads that are relatively time-sensitive and preferably will not be suspended at all, not even for a brief moment. In some embodiments, a workload includes a database, or a file system, a set of applications or resources that use, access and/or manage the database and/or file system.

A unit of work data may include one or more computing transactions and/or processes substantially performed as a group to service one or more requests. A unit of work data may include, for example, data generated by or otherwise associated with a single computing transaction and/or process, or with multiple computing transactions and/or processes substantially performed as a group to service one or more requests. A data object may include, for example, any combination of related or associated data.

In an embodiment, the continuous availability system may include a workload distribution module that collects metrics at the software application, middleware, operating system, network, and hardware levels for each workload. The continuous availability system may use the collected metrics to provide continuous availability and workload redirection capabilities across multiple computing sites.

Some embodiments of the invention provide systems and methods for achieving zero-data-loss recovery in an active-active sites configuration with a recovery time objective (RTO) measured in seconds, or at most a few minutes, for transactions that require data updates and sub-second for read-only transactions that can tolerate temperate data staleness, following an outage of a site. An RTO, as known in the art, is the maximum amount of time needed to begin normal operations after the primary site experiences an outage. The embodiments of the invention switch transactions to a geographically remote site where a remote read-only standby sharing workload coupled with a synchronous disk replication of recover logs is used for fast restart and for preventing data loss (zero RPO). Asynchronous log capture replication of the workloads to another data sharing parallel system is used for uninterrupted service. Further, the one or more embodiments of the invention described herein use an additional proxy node that is introduced to decouple the software data replication with the primary (source) site. In addition, a unified site switch procedure is executed in the various outage scenarios for performing the switch from the primary site to the backup site without data loss.

Accordingly, the one or more embodiments described herein introduce hardware synchronous replication method to ensure both sites log data evenly, then make use of software replication tool to read the active and archive log replicated from the database management systems of source site, and replay the log in the database management systems of the target (backup) site. The one or more embodiments of the invention accordingly facilitate an Active-Active solution without data loss.

Figure 4:
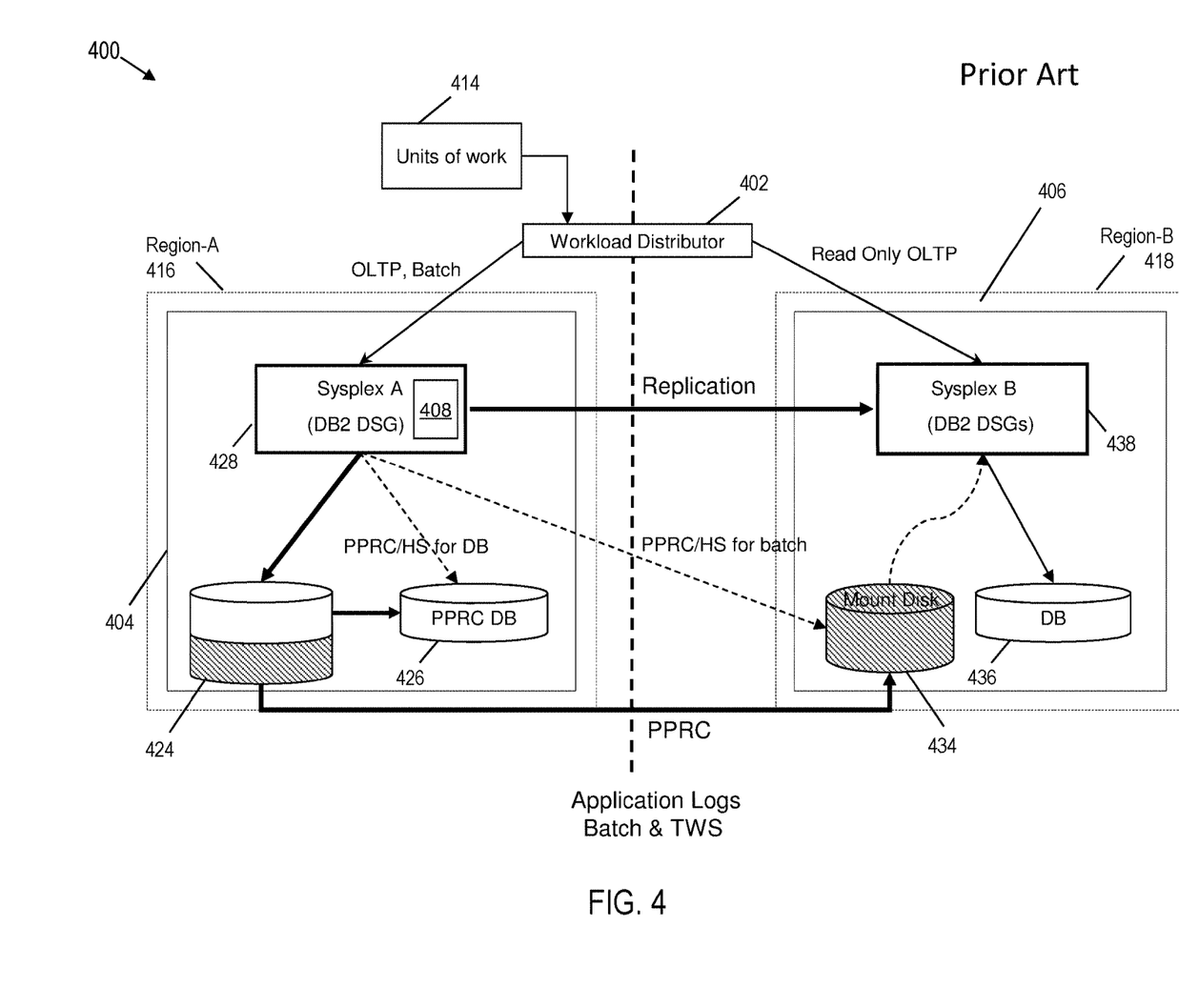
FIG. 4 illustrates a schematic diagram of a continuous availability system according to existing techniques.

With reference now to FIG. 4, a continuous availability system 400 is depicted for implementing continuous availability for workloads across multiple sites that are geographically separated, using existing techniques. The system 400 may include a workload distribution module 402 executing computer instructions. The workload distribution module 402 may operate in any type of environment that is capable of executing a software application. For example, the workload distribution module 402 may include a high-speed, multiuser, multitasking computer processing device, such as a mainframe computer. In some embodiments, the workload distribution module 402 may be associated with an enterprise (e.g., a commercial business) that implements the continuous availability across multiple sites that are geographically separated.

The continuous availability depicted in FIG. 4 may include one or more computing sites, such as, for example, site one 404 and site two 406. Each of the sites 404, 406 may include one or more systems executing one or more workloads. The workloads may include transaction processing applications, database applications, queue and queue management operations, and the like. Each of the sites 404 and 406 may include, for example, one or more network hardware devices and/or software for managing and distributing network traffic.

Site one 404 and site two 406 may be geographically distributed computing sites. For example, site one 404 may be located in one region, for example region A 416, and site two 406 may be located in another region, for example, region B 418, that is relatively geographically distant from region A 416. The geographic distance between region A 416 and region B 418 may provide for a relatively high probability that computer processing sites in region A 416 will not suffer outages, or otherwise become unavailable, at the same time as computer processing sites in region B 418. In particular, the geographic distance between region A 416 and region B 418 may provide for a relatively high probability that computer processing sites in region A 416 and sites in region B 418 will not suffer outages, or otherwise become unavailable, due to a common cause, such as a regional power outage or natural disaster.

The continuous availability system 400 depicted in FIG. 4 additionally may include a software replication module 408. The software replication module 408, may asynchronously replicate data for workloads between site one 404 and site two 406. In one or more examples, the replication may be performed using Peer to Peer Remote Copy (PPRC), which is a protocol to replicate a storage volume 424 of the site one 404 to another storage volume 434 in the remote site two 406. Further, in one or more examples, at least portions of the storage volume 424 are backed up using GDPS/PPRC HyperSwap (Geographically Dispersed Parallel Sysplex) to another disk 426 to provide continuous disk availability. Further, batch files, application logs, control files and other such information from the storage volume 424 is partially PPRCed to storage volume 434 of site two 406 for batch recovery. The storage volumes 424 and 434 may also be referred to as databases, or database management systems (DBMS), as they store the data for units of work and data that result from processing the units of work data by the sysplex(s).

A sysplex-A 428 of the site one 404 also uses a high-volume, low-latency replication (e.g. Q Replication (QREP), SQL Replication etc.) to replicate transactions to a sysplex B 438 of the site two 406. The data of multiple Data Sharing Group (DSG) from a relational database management system (e.g. DB2 etc.) 426 are replicated from site one 404 to the site two 406 which is asynchronous software replication based on recover log read, publish and transactions replay using messaging or any other technique. The site two 406 also has a relational database management system 436 in which the replication is performed.

Here a 'sysplex' refers to a cluster of computing servers that are acting together as a single system image and facilitating multiple databases for direct reads and writes to shared data. It should be noted that although the embodiments of the present invention described herein use a sysplex, in other examples, other types of computing system at the sites 404 and 406 can be used. Alternatively, or in addition, the sysplex can include a group of servers, such as a server farm, operating on one or more workloads using local load balancing, or other methods of load distributing as is known in the art. In yet another embodiment, site one (and/or site two 506) 404 may include multiple systems, each of which may execute one or more workloads. In various embodiments, site one 404 (and/or site two 406) may include a combination of servers and server farms each operating on one or more workloads.

The workload distribution module 402 and the sites 404 and 406 may be communicatively coupled via one or more networks (not shown). The networks may be implemented using any type or combination of known networking device, including, but not limited to, a wide area network (WAN), a local area network (LAN), a global network (e.g., Internet), a virtual private network (VPN), an intranet and a telephone network. The networks may be implemented using a wireless network, a wired network, or any kind of physical network implementation known in the art.

The sites, such as site one 404 and site two 406 may be coupled to the workload distribution module 402 through multiple networks (e.g., intranet and Internet) such that not all of the sites are coupled to the workload distribution module 402 through the same network. The workload distribution module 402 may be implemented using one or more servers, for example, operating in response to a computer program stored in a storage medium accessible by the server.

In the continuous availability system 400, units of work 414 initiated by users of the various systems or clients executing at the one or more sites may be distributed to one or more of the sites 404 and 406 through the workload distribution module 402. The units of work 414 may be transmitted from systems outside of the sites 404 and 406 and may be processed as workloads within one or more of the sites.

It will be readily understood by a person of ordinary skill in the art that the execution of continuous availability across geographically dispersed sites described in FIG. 4 may be implemented as modules in hardware, software executing on general-purpose hardware, or a combination thereof. Although only two sites are depicted in FIG. 4, it will be further understood that, in an embodiment, any number of sites may be implemented, and that any geographic distance may separate the sites. Furthermore, although the workload distribution module 402 is depicted as existing outside of the sites, it will be readily understood by a person of ordinary skill in the art that, in an embodiment, the workload distribution module 402 may be directly located at one or more of the sites.

The illustration of FIG. 4 is a simplified representation of the various components of the continuous availability system 400 for purposes of clarity. It will be understood by those of ordinary skill in the art, that additional or fewer components may be used in alternate embodiments. In additional embodiments, the layout and configuration of the components may differ from those of FIG. 4 without affecting the functionality of the continuous availability system 400. In additional embodiments, the various components may be located in separate modules. In further embodiments, the functionality of various components may be incorporated into a single hardware or software module.

It is to be noted that, if one of the sites of the continuous availability system 400, for example, site one 404 suffers outages, or otherwise becomes unavailable before a transaction at site one 404 is completed, this transaction may be lost before the unit of work data for the transaction get asynchronously replicated to site two 406. This is because there is a replication delay at the time of the outage of site one 404, generally on the order of sub-seconds, but possibly more if and when the outage or other system conditions affect replication delays. Therefore, the RPO for the continuous availability system 400 is non-zero, and probably as much time as the replication delay. Despite the non-zero RPO, such an asynchronous replication technique is employed by the continuous availability system 400 of some embodiments because the asynchronous replication technique allows unlimited distance between sites and avoids impacting transaction execution at a primary site for the transaction.

Figure 5:
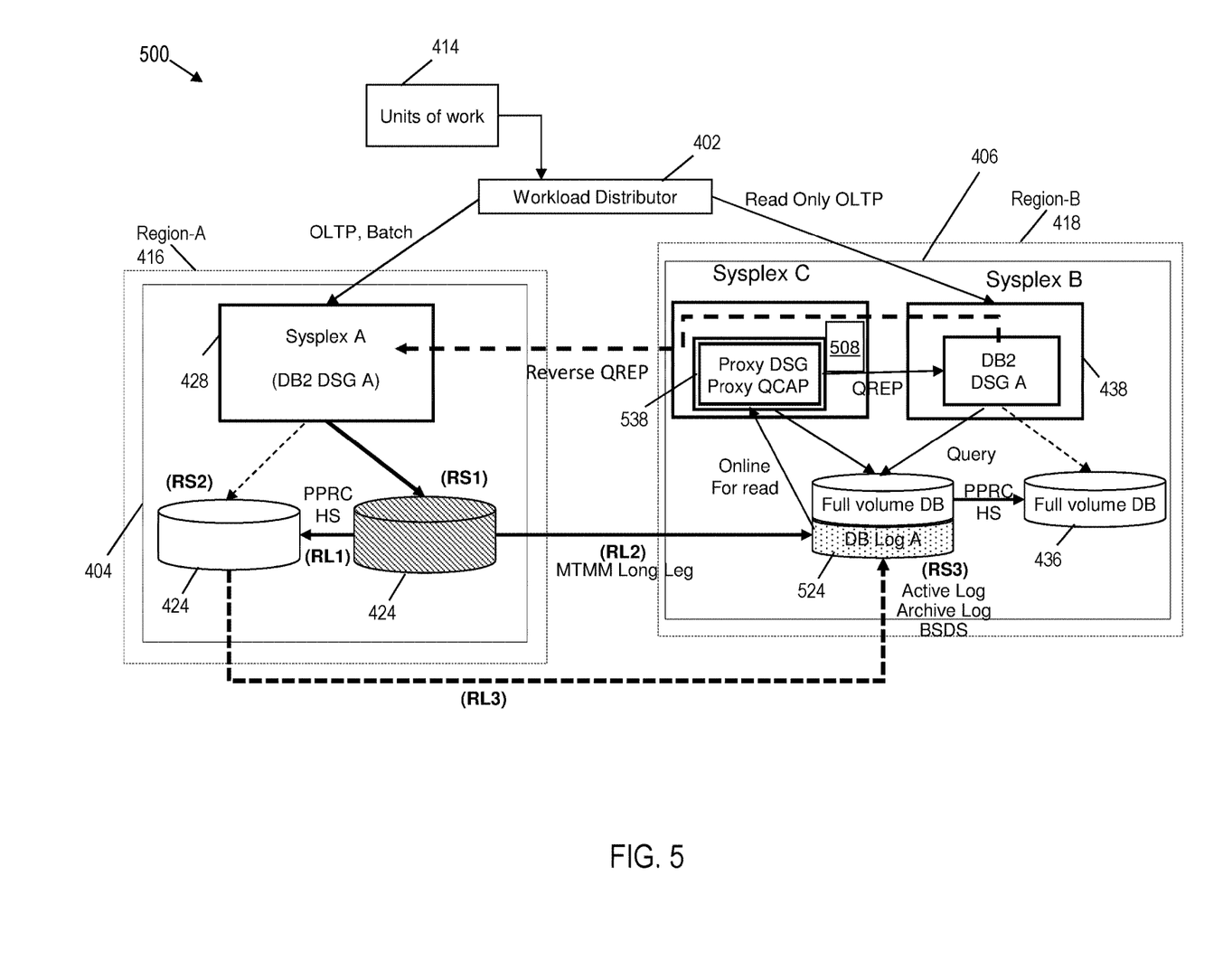
FIG. 5 illustrates a schematic diagram of a continuous availability system according to one or more embodiments of the present invention.

FIG. 5 illustrates a continuous availability system 500 in accordance with some embodiments of the invention. The system 500, unlike the system 400 described above, provides an active-active architecture without suffering any data loss (i.e., RPO of zero) when a primary site for a unit of work becomes unavailable. In some embodiments, the continuously availability system 500 includes all components of the system 400 of FIG. 4. In addition, the continuous availability system 500 includes a proxy sysplex-C 538 at site two 406 and a proxy storage unit 524 at site two 406.

The "proxy mode" capability allows the sysplex-C 538 to read log records from synchronously mirrored secondary volumes that can be several kilometers or tens of kilometers away from the source production group, for example sysplex-A 428. In proxy mode the sysplex-C 538 can read a catalog of the source sysplex-A 428, thus facilitating the proxy sysplex-C 538 to get access to the dictionaries by reading the source's compression dictionary data set (CDDS) via the mirrored secondary volumes. By moving the replication capture component from the source sysplex-A 428 to a new "proxy" sysplex (sysplex-C 538), which is failure-isolated from the source sysplex-A 428, clients of the system 500 can realize a zero data loss if the source site-A 404 experiences a failure and workloads are switched to the target site-B 406.

The logs of multiple data sharing groups are synchronously replicated into site two 406 by long leg synchronous hardware replication from site one 404 to site two 406, for example using Multi-Target Metro Mirror (MTMM) or any other such technique for hardware replication. As used herein, 'RS' is a disk location of replication storage of MTMM, with RS1 being a primary disk (at site one 404) of the MTMM replication; RS2 is a local secondary disk of MTMM replication (at site one 404 itself), which is a full synchronous target copy of RS1; and RS3 is a long leg replication storage of the MTMM replication (at site two 406), and is a second synchronous target copy of RS1. Further, as used herein, 'RL' is a replication leg used by the MTMM replication, one replication leg being responsible for each synchronous replication of RS1 into RS2 and RS3. Here the relationship between RS1 and RS2 is called as RL1 and the relationship between RS1 and RS3 is called as RL2 or an MTMM long leg because RS3 is the remote secondary replication storage. It should be noted that in other examples, different nomenclature may be used than the description here without changing the scope of the embodiments of the technical solutions described herein.

In one or more examples, the volumes of the MTMM long leg (RS3) are varied online and read only from the proxy sysplex-C 538 (and are not directly readable by sysplex-B 438). Accordingly, a copy of database log of sysplex-A (RS1) from the database 424 is synchronously replicated (RL2) in the database 524 (RS3) of the sysplex-C 538. In one or more examples, the proxy sysplex-C 538 creates a replica of the full volume database 424 of the source sysplex-A 428 at the site two 406.

Further, the proxy sysplex-C 538 asynchronously replicates data sharing groups, such as using QREP, to capture the source DSGs log from the copy in the database 524 at site two 406 (RS3) into the database 436 of the sysplex-B 438 at the site two 406. Such asynchronous replication facilitates the transactions from sysplex-A 428 to be replayed in the DSGs of the sysplex-B 438. The asynchronous replication of the database 524 (RS3) to the database 436 of sysplex-B 438 can be performed by a software replication module 508 of the sysplex-C 538.

Accordingly, data log captured (RS3) at the proxy sysplex-C 538 in the database 524 does not rely on the status of the source DSGs (RS1) and even if the source DSGs (RS1) are down (abnormally, planned etc.), the proxy data capture (RS3) at the proxy sysplex-C 538 works independently to (asynchronously) replicate the source data log of sysplex-A 428 to the sysplex-B 438. Accordingly, the site switch can be completed with Recovery Point Objective 0 even if the source site one 404 is not operative because of planned/unplanned reasons.

In one or more examples, a copy of the source data log (RS1) is also synchronously stored in a secondary copy (RS2). The secondary copy is synchronously replicated in the database 524 (RS3) of the proxy sysplex-C 538 using MTMM (RL3). In one or more examples, such synchronous replication is performed redundantly and concurrently with the synchronous replication from the primary copy of the data log (RS1). Alternatively, the replication of the secondary copy (RS2) is initiated if the replication of the primary copy fails, for example due to failure in the synchronous replication communication (RL1). Such a secondary copy replication provides an additional failsafe to ensure an RPO of 0 in case of any failure at site one 406.

Figure 6:
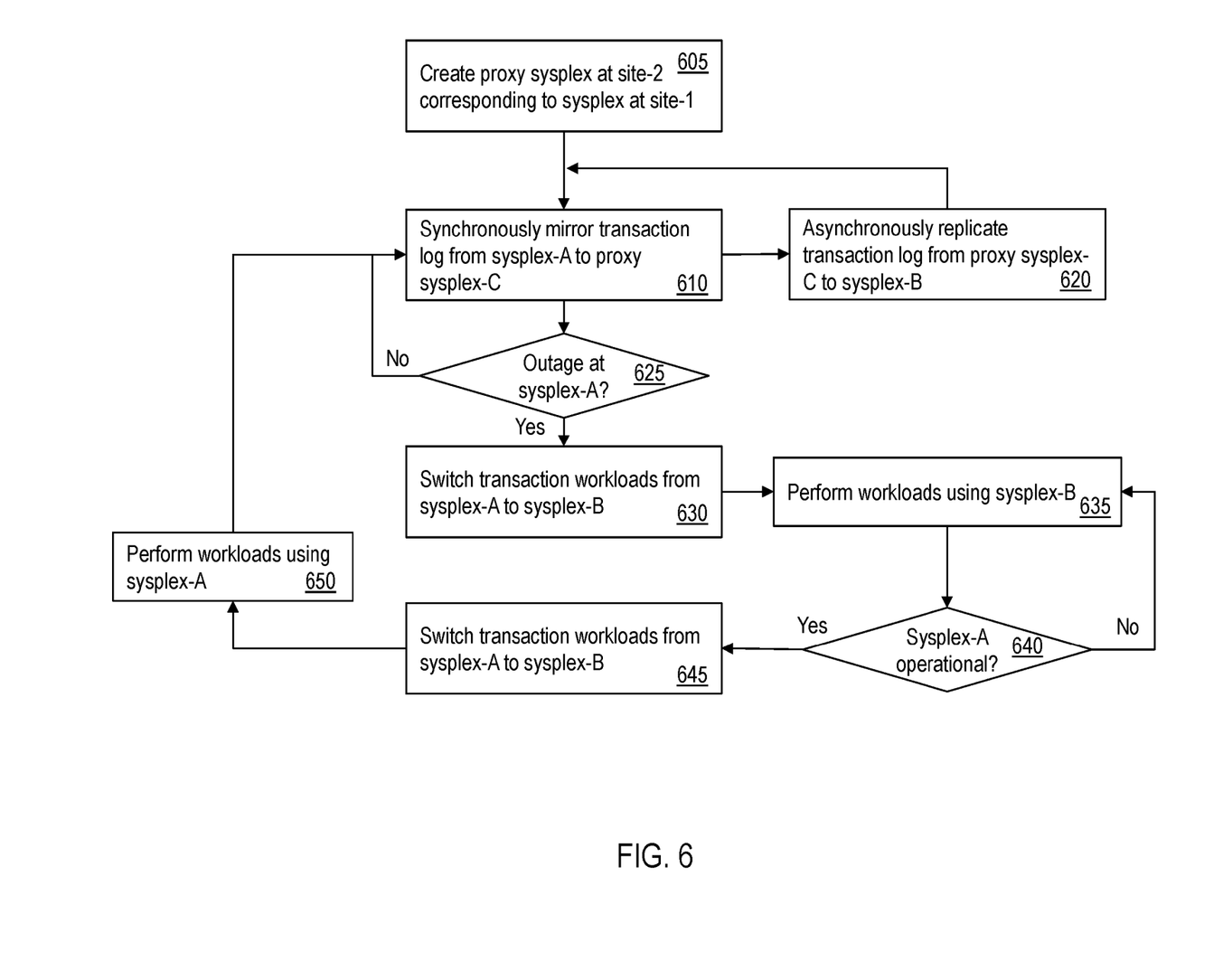
FIG. 6 depicts a flowchart of an example method for creating an active-active site failover system to enable zero data loss solutions according to one or more embodiments of the present invention.

FIG. 6 depicts a flowchart of an example method for creating an active-active site failover system to enable zero data loss solutions according to one or more embodiments of the present invention. The method includes creating the sysplex C 538 the site two 406 as a proxy of the sysplex A 428, which is at site one 404 (605). Creating the proxy sysplex C 538 includes providing the one or more computer servers of the sysplex C 538 access to the catalog of the database volume 424 of the sysplex A 428. The catalog access enables the sysplex C 538 to access transaction log of the sysplex A 428.

The method further includes synchronously replicating (mirroring) the database transaction log of the sysplex A 428 to the database 524 that is allocated to the proxy sysplex C 538 (610). The database replication capture component from the source production group (sysplex A 428) is accordingly moved to the new "proxy" group that is failure-isolated from the source sysplex A 428. This facilitates realizing a zero data loss solution when failing over from the source database group to the target group (sysplex B 438).

In one or more examples, the sysplex C 538 and the sysplex B 438 may execute on the same set of computer servers at site two 406, with sysplex C 538 configured on one or more logical partitions that are separate from one or more logical partitions assigned to execute the sysplex B 438.

In one or more examples, the sysplex-C 538 executes a program, such as QCAP (Q capture) that captures transactions or row-level changes from source tables that are part of a subscription or publication, and then sends this transactional data as messages over queues. For example, the sysplex-C 538 includes a data sharing group (DSG-C). The capture program of sysplex-C 538 is attached to (subscribed) data storage 424 of the site one 404. Accordingly, the sysplex-C 538 facilitates capturing logs using synchronous replication, such as MTMM long leg, from a copy (RS3) of the active log, archive log, and BSDS from DSG A of the sysplex-A 428 of site one 404. The volumes of RS3 are varied online and read in sysplex-C 538 because of the 'proxy mode' setting. Further, DSG-A compression dictionary and member status are replicated into RS3. The synchronous replication, (hardware replication) replicates the contents of the storage unit 424 simultaneously with or immediately after each write function to the storage unit 524. In some embodiments, the hardware replication performs disk replication, copying or mirroring a complete image of the storage unit 524. In some embodiments, the hardware replication replicates only disk I/O (input/output), and not memory I/O.

Further, the method includes asynchronous replication of the transaction log from the proxy sysplex C 538 to the sysplex B 438, at 620. The asynchronous replication may be performed using known techniques that were used to asynchronously replicate the transaction log from the sysplex A 428 to the sysplex B 438 across the two sites 404 and 406. Because of the setup described herein (FIG. 5), the asynchronous replication is performed only within site two 406, instead of across the sites. If the source DSG-A of the sysplex-A 428 develops a problem that causes a planned/unplanned outage, or downtime, or an abnormal abend, the capture program in the proxy sysplex-C 538 continues to operate and provide the logs of the DSG-A for transactions that have completed so far, and site switch to the sysplex B 438 completes successfully and gracefully (625, 630).

Figure 7:
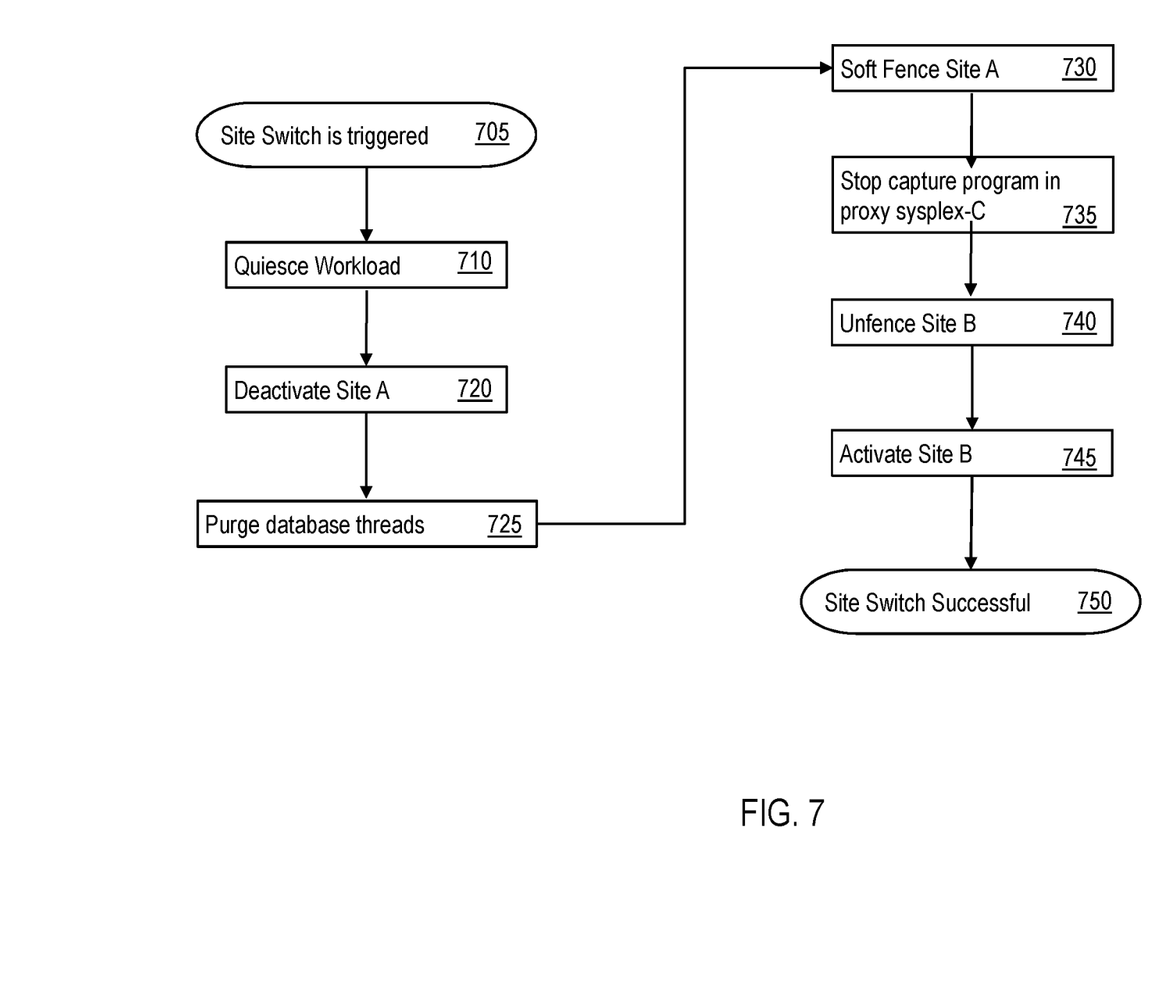
FIG. 7 depicts a method for performing a site switch according to one or more embodiments of the present invention.

FIG. 7 depicts a method for performing a site switch according to one or more embodiments of the present invention. The site switch procedures are unified and completed within 1 min as thereby having a Recovery Time Objective (RTO) of less than 1 min. The method includes initiating a site switch from site-A 404 to site-B 406 (705). The switch includes switching the workloads being performed by the sysplex A 428 to the sysplex B 438. The method for the site switch further includes quiescing the workloads queued at the sysplex A 428 (710). Further, the site A 404 is deactivated (720). The deactivation ensures that the workload distributor 402 does not assign further workloads to the sysplex A 428.

Further, any database threads at sysplex A 428 are purged (725), to ensure that the data log in the database 424 is not accessed via site one 404. Further yet, the site one 404 is 'soft fenced' to prevent unintended access to a device, set of devices in a logical subsystem (730). The soft fence can be configured using an operating system of the sysplex A 428 or any other known techniques.

The site switch method further includes stopping execution of the capture program in the proxy sysplex C 538 (735). The capture program facilitates the synchronous replication of the transaction log from the sysplex A 428 to the sysplex C 538. Further, the sysplex B 438 is unfenced (740). Further yet, the sysplex B 438 is activated to enable the workload distributor 402 to assign workloads to the sysplex B 438 for execution (745). In one or more examples, a client is notified of the successful site switch, at 750. The notification can be one or more of various types of electronic notifications, such as an email, text message, instant messenger, or any other type of audio-visual notification.

Referring to FIG. 6 again, once the switch to sysplex B 438 is performed, the workload distributor 402 performs the workloads using the sysplex B 438 (635) until sysplex A 428 is operational again (640). Once the sysplex A 428 is operational, a switch is performed from sysplex B 438 to the sysplex A 428 (645). Once the switch to the sysplex A 428 is successfully completed, workloads are again performed using the sysplex-A 428 (650).

The method an active-active system 500 that facilitates switching gracefully from one site to another with RPO=0, RTO less than 1 minute, and with zero data loss. Table 1 provides a comparison of example scenarios of site switching of the active-active system 500 (without data loss) and active-active system that is presently used.

| Scenarios | Active-Active without zero data loss | Active-Active without data loss |
| --- | --- | --- |
| Planned Switch | RPO = 0; RTO < 2 min; No exception expected; Graceful Switch | RPO = 0; RTO < 1 min; No exception expected; Unified switch procedure |
| Emergency Switch | Database/Operating System failure may affect replication (RPO > 0); Database/Operating System failure may affect Graceful Switch | RPO = 0; Site A failure will not affect replication; Unified switch procedure |
| Disaster Switch | RPO > 0, replication broke when site A fail; No Graceful Switch at this scenario | RPO = 0; Synchronous replication can guarantee the consistency; Replication won't be impacted; Unified switch procedure |

The one or more embodiments of the present invention facilitate an active-active system with site switch without data loss by decoupling data replication with a source site (site one 404 in examples herein). The one or more embodiments of the present invention accordingly ensure no data loss in case of planned or unplanned failure scenario at the source site. The one or more embodiments of the present invention accordingly are rooted in computer systems, such as server computers, and provide an improvement to the active-active sites that are used on various data and transaction intensive industry, such as that rely on Internet transactions, such as e-commerce, social media, banking, online gaming, and various other such industrial applications. The one or more embodiments of the invention described herein provide technical solutions to decouple site switch ability with transaction workload availability in Active/Active solution which ensures a graceful site switch successfully even if the source site major workload components run into a failure.

As described herein, a server cluster (sysplex-C 538) is added as a proxy node of the source cluster (sysplex-A 428) which contains database management systems (524) which are used by data replication. The data replication, in proxy node, are associated with the proxy database management systems (524) which read the updated logs from source database management systems (424) and replay the transactions in a target database management systems (436). The updated logs of source database management systems (424) are synchronously replicated into the proxy nodes database management system (524), such as by hardware replication, which ensures that the transaction logs are synchronous in both proxy node (538) and the source node (428).

If one or more component at the source site (404) such as DBMS instances (424) develop a failure, or an outage, the hardware synchronous data replication ensures that the proxy site logs (524) are the same as the data logs of the source node (424). Further, the asynchronous data replication in the proxy node (538) reads the duplicated logs from the proxy database management system (524) into the target database management system (436) without any impact from the failure/outage of the source DBMS instances (424). Accordingly, if a site switch is triggered, it can be completed gracefully.

The one or more embodiments of the present invention described herein accordingly facilitate a synchronous unit of work (UOW) data between database management systems in 2 or more sites without dependence on the primary site by decoupling a site switch ability with transaction workload availability in Active/Active solution which ensures the graceful site switch successfully even if the source site major workload components run into any issue.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing system, comprising:
a first storage unit at a first computing site, the first storage unit configured to store units of work data and data synchronously replicated from a first server cluster of a second computing site;
a second server cluster at the first computing site, the second server cluster configured to be a proxy node of the first server cluster;
a second storage unit at the first computing site, the second storage unit configured to store the units of work data and data from the first storage unit asynchronously into the second storage unit using software replication, wherein the software replication comprises selecting a subset of the units of work data to be replicated to the second storage unit asynchronously; and
a third server cluster at the first computing site, the third server cluster configured to process the units of work data asynchronously replicated into the second storage unit.

2. The computing system of claim 1, wherein the first computing site is geographically remote from the second computing site.

3. The computing system of claim 1, wherein the third server cluster is further configured to start processing the units of work data due to an outage of the second computing site.

4. The computing system of claim 1, wherein the units of work data and data from the second computing site are synchronously replicated to the first storage unit using hardware replication.

5. The computing system of claim 1, further comprising:
a hardware replication module of the second computing site configured to synchronously replicate the units of work data and the data to the first computing site.

6. The computing system of claim 2, wherein the first and second computing sites are separated by a distance greater than a metropolitan area network (MAN).

7. A method, comprising:
by a first storage unit of a first computing site, synchronously replicating units of work data and data that result from processing the units of work data by a first server of a second computing site;
storing, by a second server of the first computing site, the units of work data and the data asynchronously from the first storage unit to a second storage unit of the first computing site using software replication, the second server is a proxy node of the first server of the second computing site, wherein the software replication comprises, selecting a subset of the units of work data to be replicated to the second storage unit; and
by a third server of the first computing site, processing the units of work data asynchronously replicated from the first storage unit.

8. The method of claim 7, further comprising:
by the third server, processing the units of work data due to an outage of the second computing site.

9. The method of claim 7, wherein the first computing site is geographically remote from the second computing site.

10. The method of claim 7, wherein using software replication for storing the units of work data and the data asynchronously from the first storage unit to the second storage unit of the first computing site.

11. The method of claim 9, wherein the first and second computing sites are separated by a distance greater than a metropolitan area network (MAN).

12. The method of claim 7, by the third server of the first computing site, storing the units of work data and the data asynchronously from the second storage unit to a third storage unit of the second computing site.

13. A computer program product comprising a computer readable storage medium having stored thereon program instructions executable by one or more processing devices to cause the one or more processing devices to provide continuous computing availability for a system comprising a first computing site and a second computing site, providing the continuous computing availability comprising:
synchronously replicating, by a first storage unit of the first computing site, units of work data and data that result from processing the units of work data by a first server of the second computing site;
storing, by a second server of the first computing site, the units of work data and the data asynchronously from the first storage unit to a second storage unit of the first computing site using software replication, the second server is a proxy node of the first server of the second computing site, wherein the software replication comprises, selecting a subset of the units of work data to be replicated to the second storage unit; and processing, by a third server of the first computing site, the units of work data that are asynchronously replicated on the second storage unit.

14. The computer program product of claim 13, wherein the third server starts processing the units of work data in response to an outage of the second computing site.

15. The computer program product of claim 13, wherein the units of work data and data from the second computing site are synchronously replicated to the first storage unit using hardware replication.

16. The computer program product of claim 13, wherein the second computing site is geographically remote from the first computing site.

17. The computer program product of claim 13, wherein the first and second computing sites are separated by a distance greater than a metropolitan area network (MAN).

* * * * *